United States Patent
Watkins et al.

(10) Patent No.: US 9,806,904 B2
(45) Date of Patent: Oct. 31, 2017

(54) RING CONTROLLER FOR PCIE MESSAGE HANDLING

(71) Applicant: Oracle International Corporation, Redwood City, CA (US)

(72) Inventors: John E. Watkins, Sunnyvale, CA (US); Joseph R. Wright, Round Rock, TX (US)

(73) Assignee: Oracle International Corporation, Redwood City, CA (US)

( * ) Notice: Subject to any disclaimer, the term of this patent is extended or adjusted under 35 U.S.C. 154(b) by 70 days.

(21) Appl. No.: 14/848,233

(22) Filed: Sep. 8, 2015

(65) Prior Publication Data

US 2017/0070363 A1   Mar. 9, 2017

(51) Int. Cl.
| | |
|---|---|
| *H04L 12/423* | (2006.01) |
| *H04L 12/801* | (2013.01) |
| *H04L 12/823* | (2013.01) |
| *H04L 12/861* | (2013.01) |
| *H04L 12/879* | (2013.01) |
| *H04L 12/933* | (2013.01) |
| *H04L 29/06* | (2006.01) |
| *H04L 29/08* | (2006.01) |

(52) U.S. Cl.
CPC ............ *H04L 12/423* (2013.01); *H04L 47/32* (2013.01); *H04L 47/39* (2013.01); *H04L 49/15* (2013.01); *H04L 49/901* (2013.01); *H04L 49/9084* (2013.01); *H04L 69/22* (2013.01); *H04L 69/32* (2013.01)

(58) Field of Classification Search
CPC ......... H04L 47/32; H04L 47/39; H04L 49/15; H04L 49/90; H04L 49/901; H04L 49/9084; H04L 69/22; H04L 29/06; H04L 12/423; H04L 12/801; H04L 12/823; H04L 12/861; H04L 12/879; H04L 12/933; H04L 69/32
See application file for complete search history.

(56) References Cited

U.S. PATENT DOCUMENTS

| | | | |
|---|---|---|---|
| 7,177,971 B2 * | 2/2007 | Ajanovic | G06F 13/362 710/311 |
| 7,424,566 B2 * | 9/2008 | Manula | G06F 13/423 710/310 |

(Continued)

*Primary Examiner* — Tri H Phan
(74) *Attorney, Agent, or Firm* — Robert C. Kowert; Meyertons, Hood, Kivlin, Kowert & Goetzel, P.C.

(57) ABSTRACT

A system that includes a PCIe hierarchy may utilize a ring controller for message handling. Nodes acting as the root complex or as endpoint devices may include such ring controllers, portions of which may be implemented by dedicated circuitry on each node. The ring controllers may receive posted transactions representing messages, may return flow control credits for those transactions, may classify each message as to its type, and may write information about each message to a respective ring buffer storing information about messages of that type. A processor (or processing logic/circuitry) on the node may subsequently retrieve messages from the ring buffers and process them. The sizes and locations of the ring buffers in memory may be configurable by software (e.g., by writing to registers within the ring controllers). The message types may include correctable and non-correctable error messages, and non-error messages (including, but not limited to, vendor-defined messages).

20 Claims, 8 Drawing Sheets

(56) References Cited

U.S. PATENT DOCUMENTS

| | | | | |
|---|---|---|---|---|
| 8,031,731 B2* | 10/2011 | Yu | ............................. | H04L 49/30 |
| | | | | 370/419 |
| 8,122,177 B1* | 2/2012 | Puranik | ................... | G06F 13/28 |
| | | | | 710/308 |
| 8,295,293 B1* | 10/2012 | Brown | .................... | H04L 47/39 |
| | | | | 370/401 |
| 2005/0157700 A1* | 7/2005 | Riley | ..................... | H04L 12/28 |
| | | | | 370/351 |
| 2006/0277347 A1* | 12/2006 | Ashmore | .............. | G06F 3/0611 |
| | | | | 710/313 |
| 2007/0260796 A1 | 11/2007 | Grossman et al. | | |
| 2008/0126606 A1* | 5/2008 | Wang | ...................... | G06F 13/28 |
| | | | | 710/29 |
| 2010/0031272 A1* | 2/2010 | Gregg | ................. | G06F 13/4217 |
| | | | | 719/314 |
| 2011/0296255 A1* | 12/2011 | Watkins | .............. | G06F 11/0724 |
| | | | | 714/54 |
| 2012/0017025 A1* | 1/2012 | Luk | ..................... | G06F 13/4282 |
| | | | | 710/313 |
| 2013/0013868 A1* | 1/2013 | Allen | ........................ | G06F 5/10 |
| | | | | 711/147 |
| 2013/0060981 A1 | 3/2013 | Horn et al. | | |
| 2013/0173837 A1 | 7/2013 | Glaser et al. | | |
| 2013/0179622 A1* | 7/2013 | Pratt | .................... | G06F 13/102 |
| | | | | 710/314 |
| 2013/0185517 A1* | 7/2013 | Elboim | ............... | G06F 12/0862 |
| | | | | 711/137 |
| 2014/0181409 A1* | 6/2014 | Manula | ................. | G06F 12/123 |
| | | | | 711/133 |
| 2014/0237153 A1* | 8/2014 | Glaser | ................ | G06F 13/4027 |
| | | | | 710/313 |
| 2014/0359267 A1 | 12/2014 | Moriki et al. | | |
| 2015/0026380 A1* | 1/2015 | Egi | .................... | G06F 13/4282 |
| | | | | 710/308 |
| 2015/0201034 A1 | 7/2015 | Hellyar et al. | | |
| 2016/0147592 A1* | 5/2016 | Guddeti | ................ | H04L 1/0056 |
| | | | | 714/776 |

* cited by examiner

RING CONTROLLER FOR PCIE MESSAGE HANDLING

BACKGROUND

Technical Field

This disclosure relates to computing systems, and more particularly, to techniques for implementing a software managed ring controller for message handling within a switched fabric hierarchy.

Description of the Related Art

Computer systems may include multiple processors or nodes, each of which may include multiple processing cores. Such systems may also include various Input/Output (I/O) devices, which each processor may send data to or receive data from. For example, I/O devices may include network interface cards (NICs) or network adapters that allow the processors to communicate with other computer systems, and external peripherals such as printers. In some systems, such I/O devices may send interrupts to signal various events. For example, an I/O device may send an interrupt to signal the completion of a direct memory access (DMA) operation or another type of operation. An I/O device may send a message to inform software of an internally detected error, or of an error on an I/O link coupled to the I/O device.

System I/O architectures such as PCI Express (PCIe) have become extremely successful and adopted throughout the computer industry. Within a typical PCIe hierarchy, one node is designated as the root complex within the fabric and is responsible for resource allocation for itself and for all other fabric nodes (e.g., various switches and endpoint devices). PCIe message packets, in most systems, form a small fraction of the overall transaction layer packet (TLP) traffic. These systems are typically set up to handle large quantities of regular communication packets (e.g., standard communications in the form of posted transaction packets, non-posted transaction packets, and completion packets), but not for handling large quantities of error messages or other exception-related messages.

In many PCIe based systems, the predominant use of messages is in error reporting to the root complex, although the PCIe standard also supports messages that target an endpoint. For example, endpoints can be recipients of broadcast packets, such as Vendor-Defined Messages (VDMs), and there are no constraints on how frequently VDMs can be sent by a broadcaster in the hierarchy. Power Management Event (PME) messages are also received by endpoints, in some systems.

SUMMARY

Various embodiments of a system, an apparatus, and methods for implementing a ring controller for message handling within a switched fabric hierarchy are described herein. In some embodiments, the system may include a switched fabric hierarchy (e.g., a PCIe hierarchy) with a single root complex component and multiple endpoint devices.

In various embodiments, a node acting as the root complex or as an endpoint device may include a ring controller. The ring controller may receive posted transactions representing messages, and may return flow control credits for those transactions prior to processing the messages. The ring controller may also classify each message as to its type, and may write information about each message to a respective ring buffer that stores information about messages of that type. For example, in some embodiments, in order to determine the type of a message, logic within the ring controller may be configured to compare a value of a field in the packet header of the corresponding posted transaction or in the message contents to predetermined criteria for classifying messages as to their type.

In various embodiments, the ring controller in a given node may manage the configuration and contents of multiple ring buffers in memory, each of which stores information about a different type of message. For example, on a node acting as the root complex, the ring controller may manage multiple ring buffers that store information about different types of errors messages and non-error messages that may be received by the root complex from various endpoints or other components in the system (e.g., information about correctable errors and non-correctable errors may be stored in different ring buffers, and information about one or more types of non-error messages may be stored in one or more other ring buffers). In one example, on a node acting as an endpoint, the ring controller may manage one or more ring buffers that store information about vendor-defined messages (e.g., information about different types of vendor-defined messages or vendor-defined messages containing different classification information may be stored in different ring buffers) and/or other types of non-error messages (e.g., power management event messages).

In some embodiments, following the performance of an enumeration operation to discover the devices in the switched fabric hierarchy and initialization of the hierarchy by the root complex component, software running on the root complex component may configure the ring controllers in the root complex and/or on various endpoint devices, and may allocate memory for the ring buffers to be managed by those ring controllers. For example, in some embodiments, the sizes and locations of the ring buffers in memory may be configurable by software (e.g., by writing to various registers within the ring controllers). More specifically, software running on the root complex may, in various embodiments, configure a given ring buffer for use by performing one or more of the following: allocating memory for the ring buffer, determining the size of the ring buffer, storing the determined size in a register (e.g., within the ring controller on the corresponding node), determining the starting address for the ring buffer, storing an indication of the starting address for the ring buffer in a register (e.g., within the ring controller on the corresponding node), setting the value of a head pointer for the ring buffer in a register (e.g., within the ring controller on the corresponding node), initializing the value of a tail pointer for the ring buffer in a register (e.g., within the ring controller on the corresponding node), or initializing the value of a counter associated with the ring buffer (e.g., within the ring controller on the corresponding node).

In some embodiments, at any point after a message has been stored in a ring buffer by the ring controller on a given node, a processor (or processing logic/circuitry) on the node may retrieve the message (or another messages stored in that ring buffer or in another ring buffer) in order to process the message. In some embodiments, the processor (or processing logic/circuitry) may be configured to select the message from among messages stored in the ring buffers dependent on a relative priority between the individual messages (e.g., based on FIFO ordering or another ordering policy) and/or dependent on a relative priority between message types.

In some embodiments, the ring controller on a given node may determine that, for a given posted transaction, the message is to be dropped. For example, the message may be dropped if the ring controller determines that information in the packet header or contents of the posted transaction does not match any of the pre-determined criteria for classifying the message as being of one of the message types stored in the ring buffers managed by that ring controller. In some embodiments, if the ng controller determines that the ring buffer into which information about a given message should be stored is full, the ring controller may be configured to drop the message without being processed, generate an interrupt indicating that the message was dropped, and/or increase the size of the target ring buffer.

Figure 1:
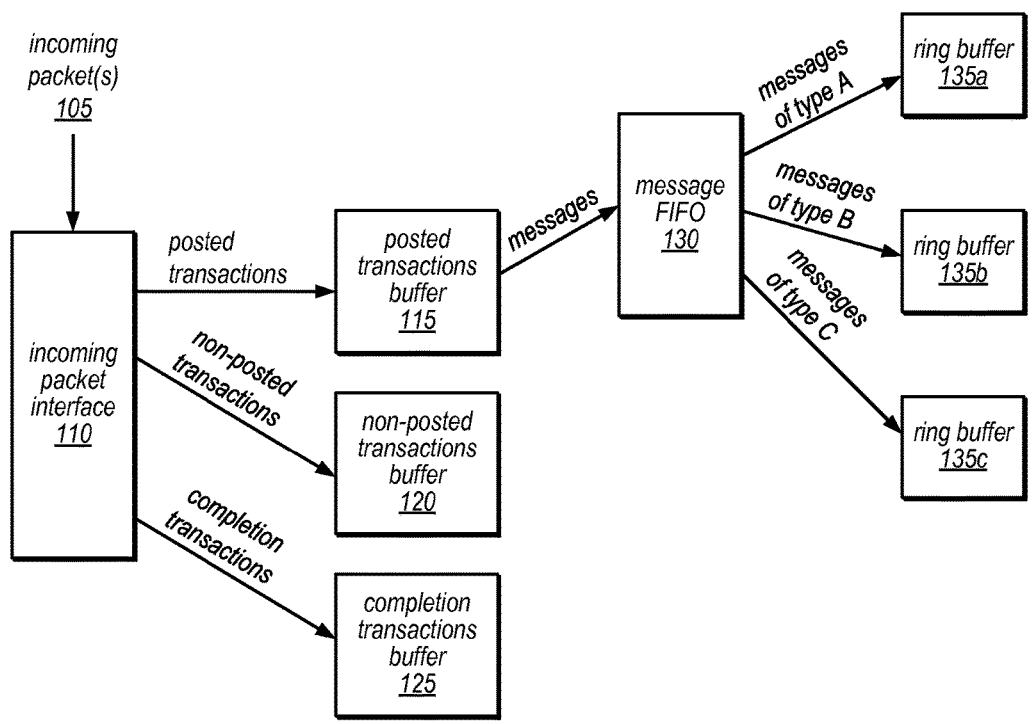
FIG. 1 is a data flow diagram illustrating how some incoming packets are handled in a switched fabric hierarchy, according to at least some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As described in more detail herein, a switched fabric hierarchy (e.g., a PCIe hierarchy) may use on-chip hardware in a PCIe device to intercept incoming message packets (e.g., message TLPs) from other PCIe devices, quickly categorize them, and place them at a programmable location (e.g., in external DRAM or in an internal bank of SRAM) that can be subsequently serviced by an on-chip processor (or processing logic/circuitry). For example, the messages may be stored in ring structures having configurable sizes and/or other configurable parameters. This approach may allow the PCIe device to reliably capture bursts of message packets (e.g., error messages or non-error messages) without imposing delays in returning the posted flow control credits to the appropriate link that might otherwise occur due to a software examination of the messages (e.g., when multiple nodes within the PCIe hierarchy may be reporting errors or when a high rate of broadcast packets are being received).

In some embodiments of the systems described herein, when certain types of errors take place (including, e.g., errors that take place between the root complex and endpoint traffic flows), they may be sent to the root complex to be handled. For example, the error may be associated with a switch through which traffic going between the root complex and the endpoint passes. In some cases, errors associated with these traffic flow may be handled by the root complex, in which case the root complex may have to examine registers inside the endpoint devices in order to make the appropriate decisions to keep the maximum number of nodes up and running and/or to perform any sort of required clearing of errors (e.g., in a restoration of process).

In some embodiments, there may be different classifications of errors. For some classes of errors, when an error is encountered, an affected endpoint may become aware of some of the error directly and may be able to attempt a retry or otherwise attempt to handle the error. However, in some embodiments, all error handling may go through the root complex. In such embodiments, even though an error may have involved a flow between two endpoint devices or between a particular endpoint and a shared I/O device, the root complex may act as a third party that is involved in the handling of that error. In some embodiments, these systems may take advantage of Advanced Error Reporting (as defined by the PCIe specification) and special error messaging in order to handle errors. For example, when an error is encountered, one of the affected endpoint devices may send out a special type of packet as an error message packet, and these types of message may only be able to flow from the endpoint device up to the root complex.

As previously noted, PCIe message packets (which are distinct from normal communication traffic packets such as those representing memory reads, memory writes, etc., and have a different purpose) may, in most systems, form a small fraction of overall transaction layer packet traffic. In many systems, the predominant use of PCIe message packets is in error reporting to the root complex, or in other relatively rare exception situations. However, under error or exception conditions, a large number of these messages may be generated within a short period of time. These message packets (which are posted writes) are defined as part of the PCIe specification, and include a different header definition than that of normal communication traffic packets. For example, the fields inside of the header include different encodings and the packet format is different.

A typical PCIe hierarchy may include a root complex and a small number of endpoint devices (e.g., a disk controller, a network interface, and/or other endpoint devices). In such a system, the root complex may be responsible for fielding and handling errors, performing maintenance tasks on behalf of the PCIe hierarchy, and, in some cases, performing portions of a mission-mode application that is executing in the system. If any endpoint detects errors with the links, it may report these errors to the root complex for handling. However, if there is a large number of endpoint devices associated with a given root complex (e.g., one dozen, or many more), it may be possible (e.g., during certain time periods or in response to particular events) for a large number of these error messages to be sent to the root complex at once.

Typically, the root complex includes a special handler for these types of messages, but there is only a very limited capacity to queue up and process these types of messages. Therefore, in a large, high-performant system, it may be easy to overrun the capacity of the root complex to handle the messages it receives. In other words, when a PCIe root complex is in a PCIe hierarchy containing many endpoints and the system demands high RAS (Reliability, Availability, and Serviceability) attributes of that hierarchy, standard PCIe error message logging facilities may not be able to capture information (e.g., the identifiers) of multiple messages that are received from different endpoints concurrently. The error framework software may, consequently, have less timely error reporting information from the hierarchy with which to make decisions and to take corrective actions (e.g., actions that may be needed to keep members of the hierarchy operating or to transfer information from a node with degraded behavior to another location before it degrades to a non-accessible state). The techniques described herein may allow the root complex to obtain and classify information for a much larger number of error messages than in a typical system, even when it has not yet had time to process them.

Note that there are certain types of message packets that may be sent to a component other than the root complex. For example, in some embodiments, endpoint devices may be recipients of broadcast packets such as Vendor Defined Messages (VDMs) and/or Power Management Event (PME) messages. These VDMs may be broadcast packets that originate from the root complex and that are periodically sent out through a switch to all of the nodes in the fabric that reside beneath that switch. They may include an encoding that a vendor may have attached some meaning to, and unless the endpoint knows what that meaning is, it may ignore and discard them. However, the endpoints must process them and ensure that the appropriate flow control credits are returned in a timely manner in order to prevent performance problems, or worse. For example, failing to return credits in a timely manner may result in a stall or deadlock as the PCIe transaction layer of an endpoint's link partner may be blocked from issuing a queued request due to ordering rule constraints.

Note that common to both the root complex and endpoint situations described above may be a need to return link credit in real time, a desire to save message packets without loss for processing when the processor (or processing logic/circuitry) has time to do so, and a desire to categorize messages so that the processor (or processing logic/circuitry) can service higher priority messages before lower priority messages (in some cases). Note also that message storage may become costly if buffer sizing is based on a fixed, conservative expectation of errors, broadcast messages, or other message traffic patterns. In some existing systems, on-chip registers may be used to store these incoming messages. However, the capacity provided by a register implementation may be fixed and unable to be changed once the PCIe device has been built. For example, the registers defined and used with Advanced Error Reporting (as defined by the PCIe specification) may be adequate in some systems, but in systems that include large hierarchies, they may not be adequate. Existing solutions that place incoming messages into a FIFO or SRAM are also limited in size and can be expensive. A smaller capacity SRAM or FIFO based solution may reduce cost but may increase the likelihood that a critical error could be missed.

In one example, the PCIe specification defines a mechanism by which, if multiple correctable errors are received by the root complex, the root complex may receive an indication that more than one correctable error was received, but may only receive information about the sender for a single one of those errors. For example, if three endpoint devices are generating and sending correctable error messages to the root complex, the root complex will capture the RID (the routing identifier) of the first such message that is received, and/or the bus number, function number and/or device number of the endpoint that sent the message. However, when the next error message arrives, if the operating system on the root complex has not gotten around to servicing the first error message, the root complex may receive an indication saying that another error message was received, but the RID and other identifiers of the second message will not be captured. Therefore, the root complex may not be able to determine which endpoint sent the message. The processing time for these error messages may (depending on the system) be substantial, since there may be other tasks being performed on the root complex that are more critical. Typically, in order to service an error, the error handler may have to walk certain parts of the hierarchy, read values from one or more registers, write values to one or more registers, etc., which may take a number of microseconds or longer to complete. During that time, other events could take place that generate additional error messages, and the root complex may not be able to keep up with the issue rate of these packets, i.e., capturing information about errors, classifying them, and taking the corrective actions that are needed to avoid having to shut down the system (or a large number of nodes in the system).

In at least some embodiments of the systems described herein, incoming messages may be categorized and placed in a buffer in low cost storage (e.g., a ring structure in system DRAM), and the capacity of the buffer may be adjustable by software. The destination location for the storage of the messages may be software programmable using inexpensive registers. In these systems, the end user may be able to choose where the messages will reside by supplying the hardware with the starting address at which each of multiple ring buffers will reside. In some embodiments, off-chip DRAM may be used as the memory for message storage rather than on-chip SRAM. In some systems, the off chip DRAM may be extremely large (e.g., many gigabytes), which may allow large ring buffers to be used for message storage without any practical concern for overruns or missing messages due to memory capacity issues. After the messages have been stored, they may be subsequently retrieved by a processor (or processing logic/circuitry) on the recipient node for processing when the processor (or processing logic/circuitry) has time to do so. In other words, there may be no need to attempt to process a large number of incoming messages in real time in order to make decisions based on information about the messages. This approach may scale well as the number of nodes, the number of errors a given node might produce, and/or the quantity of broadcast packets increases.

In some embodiments of the systems described herein, hardware may intercept the incoming messages and route each of them to the proper message ring location based on its type. These ring structures may each be programmed to be different sizes, thus allowing for optimum use of memory. This approach may also allow for adjustment on the fly while the system is operational. Static methods used in existing systems (e.g., those that rely on registers or on-chip SRAM) do not support such flexibility. For example, some prior industry solutions have used on-chip SRAM for message storage, which limited the amount of memory available for messages. In those systems, certain hierarchy error conditions result in missed error messages and a lowering of system RAS metrics. By contrast, the programmable solution described herein may allow for a large amount of memory to be used, thus making missing errors unlikely. This approach is also highly flexible due to its programmability. For example, during the system development phase or even during debug at a customer site, additional system memory may be temporarily dedicated to message capture until the problem is solved. In general, this approach is highly scalable and adaptable to the size and needs of the system in which it is applied.

As noted above, in some embodiments, individual ring structures may be used to store information about messages of specific (different) message types. For example, correctable error messages may be routed to one ring buffer, non-correctable errors may be routed to another ring buffer, and non-error or informational messages may be routed to a third ring buffer. These rings may be individually sized, as needed, by software. The use of multiple ring buffers may also allow software to prioritize the handling of particular critical messages since the processor (or processing logic/circuitry) will receive a notification when there is a new entry in any of the message rings. Non-critical messages may thus be serviced at a higher latency without worrying about a loss of message information, while critical error messages may be serviced immediately, if desired.

In at least some embodiments, the techniques described herein may handle returning any necessary PCIe flow control credits in response to receipt of a PCIe message, even before the recipient (e.g., the root complex or an endpoint device) has had a chance to handle it (e.g., to record it, parse it, and/or make a decision about any action to take in response to the message). For example, if a read request is issued in the middle of a stream of incoming message packets (e.g., error messages or VDMs, both of which are posted writes), the systems described herein may take the message packets and (effectively at line rate, or very close to line rate) route them off into a memory-based buffer and quickly return the appropriate flow control credits. Under this approach, since the appropriate credits are returned quickly for the posted writes that were received before the read request was received, completion responses may be able to be issued quickly (e.g., they may not be blocked waiting for the credits for the posted writes to be returned).

In some embodiments, incoming messages may be classified at multiple points prior to being processed. For example, in some embodiments, hardware within the recipient node (e.g., the root complex or an endpoint device) may intercept incoming packets and may determine that an incoming packet (one that is a posted write) is actually a message, rather than another type of transaction, and may store the message temporarily (e.g., in a small FIFO or other small data structure in local memory on the recipient node). The hardware may then analyze each message to classify it as to its type. For example, under the PCIe specification, there are three types of error messages: messages representing correctable errors, messages representing fatal non-correctable errors, and messages representing non-fatal, non-correctable errors. These messages are typically received by the node acting as the root complex from endpoint devices (or other system components). In some embodiments, a node acting as an endpoint device or as the root complex may receive non-error messages or informational messages, which may also be categorized as to their types and stored on corresponding ring buffers for subsequent processing. On some nodes (e.g., endpoint devices), these non-error messages may include vendor-defined messages (VDMs). In some embodiments, each of the non-error messages may be characterized based on information found in the packet header for the message and (at least in the case of some VDMs) based on other information in the message. The hardware may, after categorizing a message, place the message on an appropriate ring (e.g., a ring buffer that is explicitly configured to store messages of the determined type). As previously noted, each ring buffer may be sized individually by the operating system running on the root complex during initialization of the hierarchy and/or may be resized, as needed, during operation, in some embodiments.

In some embodiments, some or all of the hardware described herein for performing the classification of messages and that routes them to the appropriate ring buffers may reside on a processor chip of a node in a switched fabric hierarchy. This processor chip may include hardware dedicated to the PCIe interface, which may include respective buffers for packets of different traffic types (e.g., posted transactions, non-posted transactions, and completion packets), and may include separate buffers for packet headers and data for each traffic type, as described in the PCIe specification. For example, the hardware may include circuitry that implements firmware, a state machine, or other processing logic to handle PCIe messages and/or to perform other functions of the ring controller. In addition, the processor chip may, in the systems described herein, include a small FIFO RAM structure into which messages are placed (after being classified as messages) prior to being classified as to their message types and written out to a ring buffer in main memory. The hardware within the processor chip may, in addition to analyzing the packet headers (and/or other information about the messages) and deciding which ring buffers they should be routed to, perform additional ring management operations. For example it may manage pointers to the head and/or tail of the ring buffers (which may be stored in local registers), the size of the ring buffers, and counters associated with the ring buffer. The processor chip may also, at a later time that is convenient to the processor and the applications running thereon, retrieve information about the messages from the FIFO and classify them as to their message type. Note, however, that flow control credits for each message may be returned by the node once information about the corresponding posted write transaction is placed in the PCIe buffer for posted writes (i.e., prior to the packet being classified as a message or as a message of a particular type). Note also that information about memory posted writes (which are distinct from messages) is not placed in the message FIFO.

FIG. 1 is a data flow diagram describing how some incoming packets may be handled on a node in a switched fabric hierarchy, according to at least some embodiments. In some embodiments, the node may act as a root complex component in a switched fabric hierarchy (e.g., a PCIe hierarchy). In other embodiments, the node may act as an endpoint device in a switched fabric hierarchy (e.g., a PCIe hierarchy). In this example, incoming packets 105 may be received by an incoming packet interface component 110 of the node (or of a ring controller block within the node). These incoming packets 105 may include packets of a variety of different types, each of which may be handled differently by the node. For example, one subset of the incoming packets may represent posted transactions, and these packets may be routed to a posted transactions buffer 115 on the node for initial processing. Another subset of the incoming packets may represent non-posted transactions, and these packets may be routed to a non-posted transactions buffer 120 on the node for initial processing. Yet another subset of the incoming packets may represent completion transactions, and these packets may be routed to a completion transactions buffer 125 on the node for initial processing. In some embodiments, once an incoming packet has been routed to one of posted transactions buffer 115, non-posted transactions buffer 120, or completion transactions buffer 125, appropriate flow control credits may be returned (e.g., without waiting for the packet to be fully processed).

As described herein, some PCIe transactions may represent messages (which, according to the PCIe standard, are particular types of posted writes). In some embodiments, such packets may be stored in a message FIFO 130 prior to any further processing. The message contained in each of the packets may then be examined to determine the type of the message, and different messages may be written out to respective ring buffers (which may be implemented on the node or in memory that is external to the node, in different embodiments). In the example illustrated in FIG. 1, messages of type A may be written out to ring buffer 135a, messages of type B may be written out to ring buffer 135b, and messages of type C may be written out to ring buffer 135c. As described herein, and depending on which node receives the message (e.g., the root complex or an endpoint device), the messages may include error messages of various types, non-error messages of various types (including, but not limited to vendor-defined messages), or some other subset(s) of received messages that are buffered for subsequent processing.

As previously noted, in some embodiments, software programmable registers may be used to program the size of the ring buffers and their starting addresses in the address map (be it in external memory or in an on-chip memory location). Once these registers have been configured, software may be used to enable the logic that will capture the incoming messages by setting the "ring enable" bits of the control registers. When a PCIe message arrives it may be placed on a small FIFO structure that may collate the message and, after the message is classified, may send it out to one of the ring buffers over the processor chip's main bus interface as data, with the initial address being what was programmed during configuration as the start address. The hardware within the processor chip may then calculate and update the ring head and tail pointer registers, update a counter in the ring status register to reflect the number of messages that are stored in the ring buffer, and send an interrupt to the local processor (or processing logic/circuitry) signifying that a message is on the ring.

In some embodiments, software running on the processor may, at any point subsequent to storing the message on the appropriate ring, service the interrupt, read the proper status registers, and service the message, as needed. Note that, as part of servicing the message, the processor may update a register that will signify to the hardware that the message has been read from the ring location. The hardware may then (again) update the head and tail pointer registers for the ring, update the counter in the ring status register to reflect the new number of messages in the ring, and update the interrupt status to reflect that the message has been read. This procedure may then be repeated for all messages that are to be serviced. Note that, in some embodiments, a maskable interrupt line may remain active until all messages in a particular ring (or in all of the rungs) have been serviced. Other information, such as an indicator that the ring is full, an indication that a message was dropped (e.g., due to the ring being full), or an indication of an illegal configuration error, may be provided to the processor (or processing logic/circuitry) via interrupts and interrupt status registers, in some embodiments.

Figure 2:
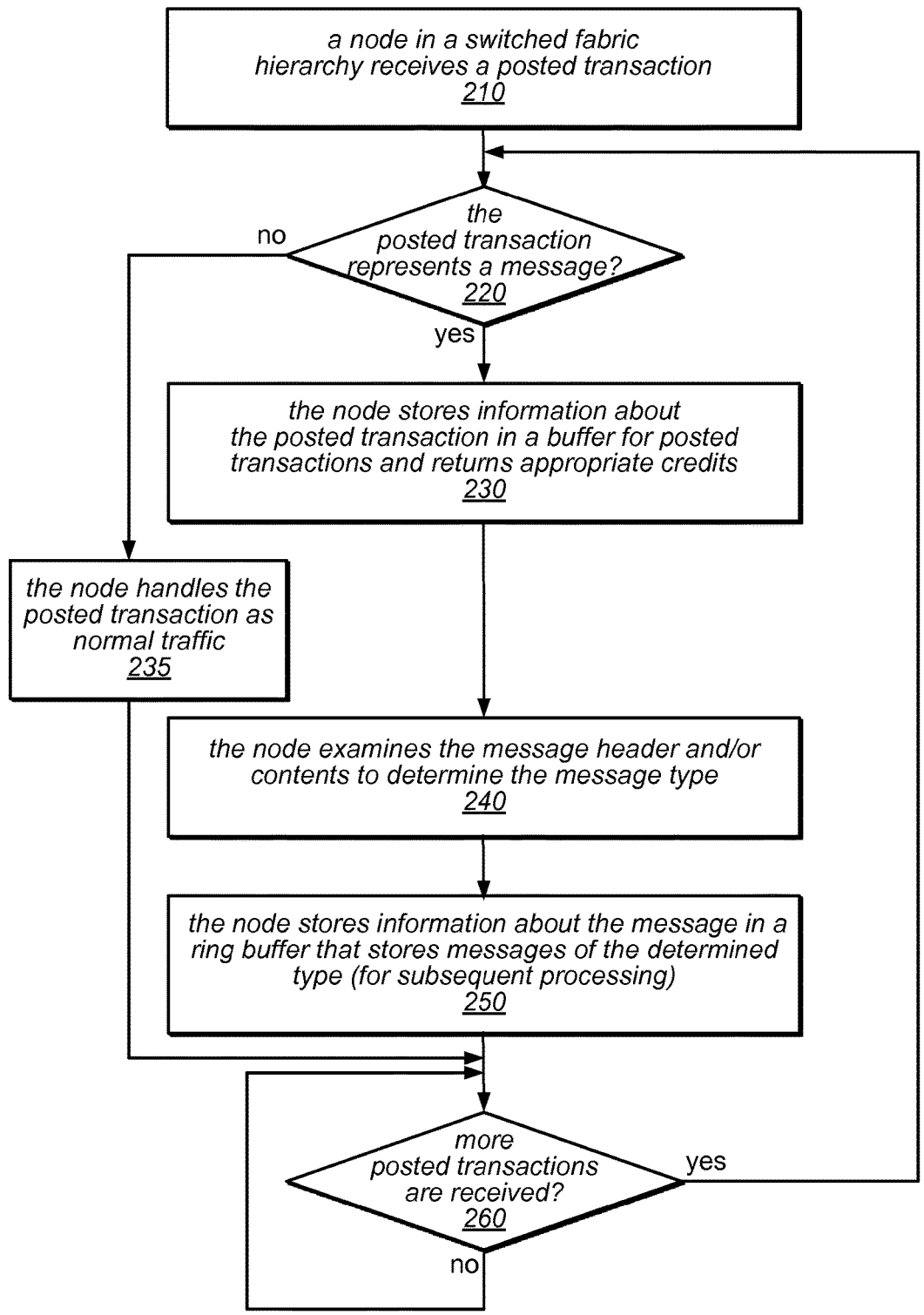
FIG. 2 is a flow diagram illustrating one embodiment of a method for handling messages in a switched fabric hierarchy.

One embodiment of a method for handling messages in a switched fabric hierarchy (such as a PCIe hierarchy) is illustrated by the flow diagram in FIG. 2. As illustrated at 210, in this example, the method may include a node in a switched fabric hierarchy receiving a posted transaction. If the posted transaction represents a message (shown as the positive exit from 220), the method may include the node (or a component thereof) storing information about the posted transaction in a buffer that is configured to store information about posted transactions and returning the appropriate flow control credits, as in 230. In this case, the method may also include the node examining the message header and/or the message contents to determine the message type, as in 240. In addition, the method may include the node storing information about the message in a ring buffer that stores information about messages of the determined type for subsequent processing by the processor (or processing logic/circuitry) on the node (as in 250). For example, in some embodiments, a ring controller of the node may write information about the message to a location whose address is identified by the value currently stored in a tail pointer for that ring buffer.

As illustrated in this example, if the posted transaction does not represent a message (shown as the negative exit from 220), the method may include the node handling the posted transaction as normal communication traffic (e.g., using the standard processing used to handle non-message packets), as in 235. In either case, if and when more posted transactions are received (shown as the positive exit from 260), the method may include repeating at least some of the operations illustrated in 220-250 (as applicable) for each additional posted transaction (e.g., regardless of whether or not any or all of the previously received posted transactions have already been processed).

Figure 3:
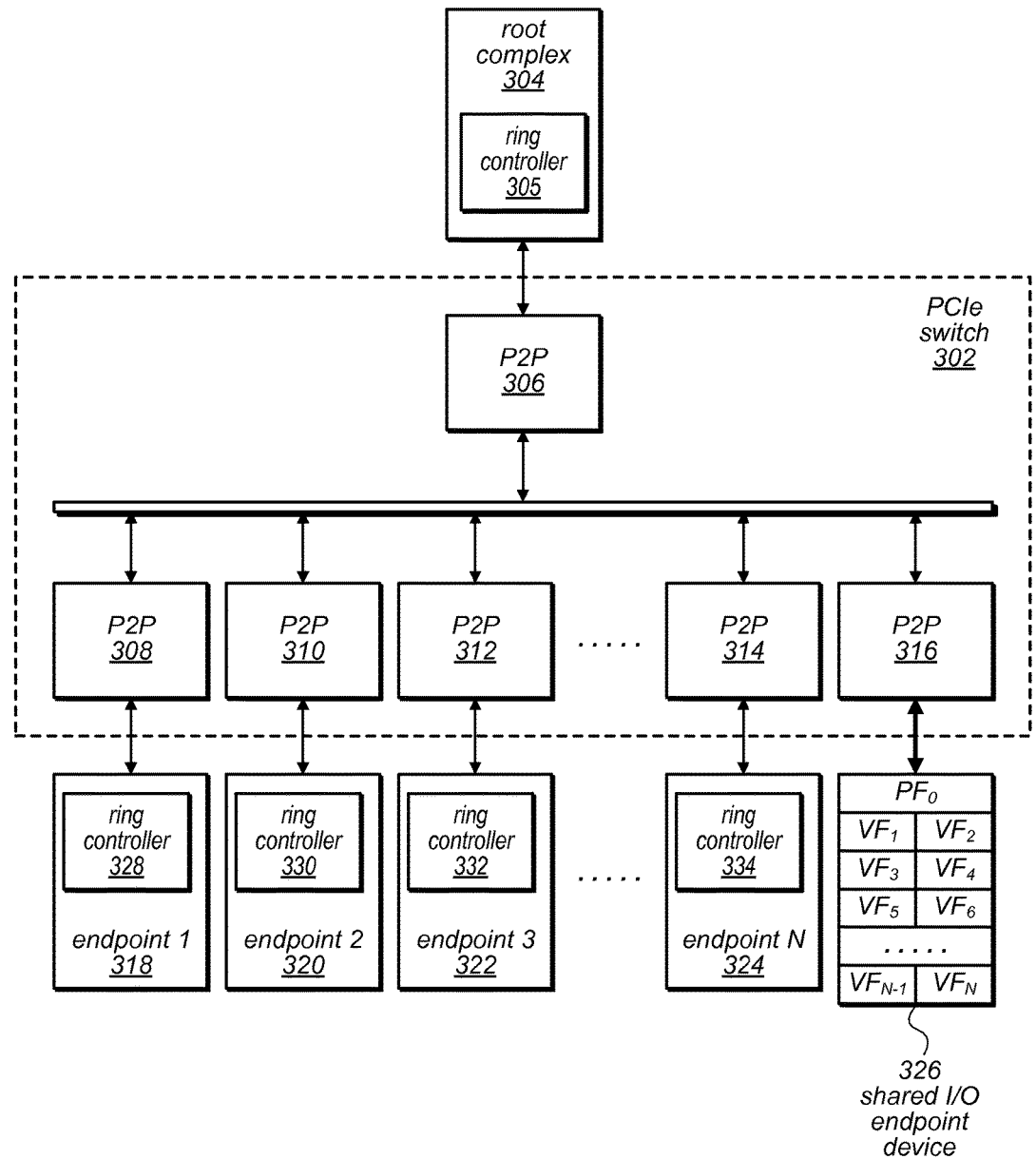
FIG. 3 is a block diagram illustrating one embodiment of a PCIe hierarchy that includes a single root complex and multiple endpoint devices.

A typical PCI Express (PCIe) hierarchy may include a single root complex (RC), multiple endpoint devices (EPs), and a PCIe switch. One embodiment of such a PCIe hierarchy (a hierarchy to which the techniques described herein may be applicable) is illustrated by the block diagram in FIG. 3. In this example, various ones of the endpoint devices may be processing nodes, I/O devices, peripheral devices, or other types of nodes in the PCIe hierarchy. In this example, one of the endpoint devices (shown as shared I/O endpoint device 326) is a shared I/O device that is compliant with the PCISIG Single Root I/O Virtualization (SR-IOV) specification. In this example, the shared I/O endpoint device includes one physical function (PF) and N virtual functions (VFs). In this example, the PCIe hierarchy also includes multiple other endpoint devices (shown as endpoints 318-324), a PCIe switch 302 (which includes PCI-to-PCI interface mechanisms 306-316), and a node 304 that is configured as the root complex for the hierarchy. Note that PCI-to-PCI interface mechanisms such as interface mechanisms 306-316 may sometimes be referred to as PCI-to-PCI bridges. In this example, root complex 304 may include a device driver for the PF of the shared I/O device 326, and may also include a respective device driver for each of the VFs of the shared I/O device (not shown). In this example, each endpoint device may also include a root complex communication driver (not shown). Note that, in other embodiments, a PCIe hierarchy may include more, fewer, and/or different types of components. For example, a PCIe hierarchy in which the techniques described herein may be implemented may include more or fewer endpoint devices (or one or more types) than are depicted in FIG. 3, and may or may not include a shared I/O device.

In some embodiments, the operating system (via the root complex) may performs a discovery and initialization process in which the hierarchy is discovered, bus numbers are established, and a PCIe address map is created that allocates memory space for various resources needed by various ones of the endpoint devices. In some embodiments, communication traffic may be sent directly between endpoint devices. However, in the typical PCIe hierarchy, data and interrupt traffic flow may take place between the endpoint devices and the root complex. In some embodiments, in addition to the traditional north-south DMA traffic that goes between an endpoint and a root complex, peer-to-peer traffic from endpoint-to-endpoint may be supported in the PCIe hierarchy. For example, in some embodiments, the system may support peer-to-peer traffic between a particular endpoint (one of endpoints 318-324) and the shared I/O device 326, or between two of the endpoint nodes.

Figure 4:
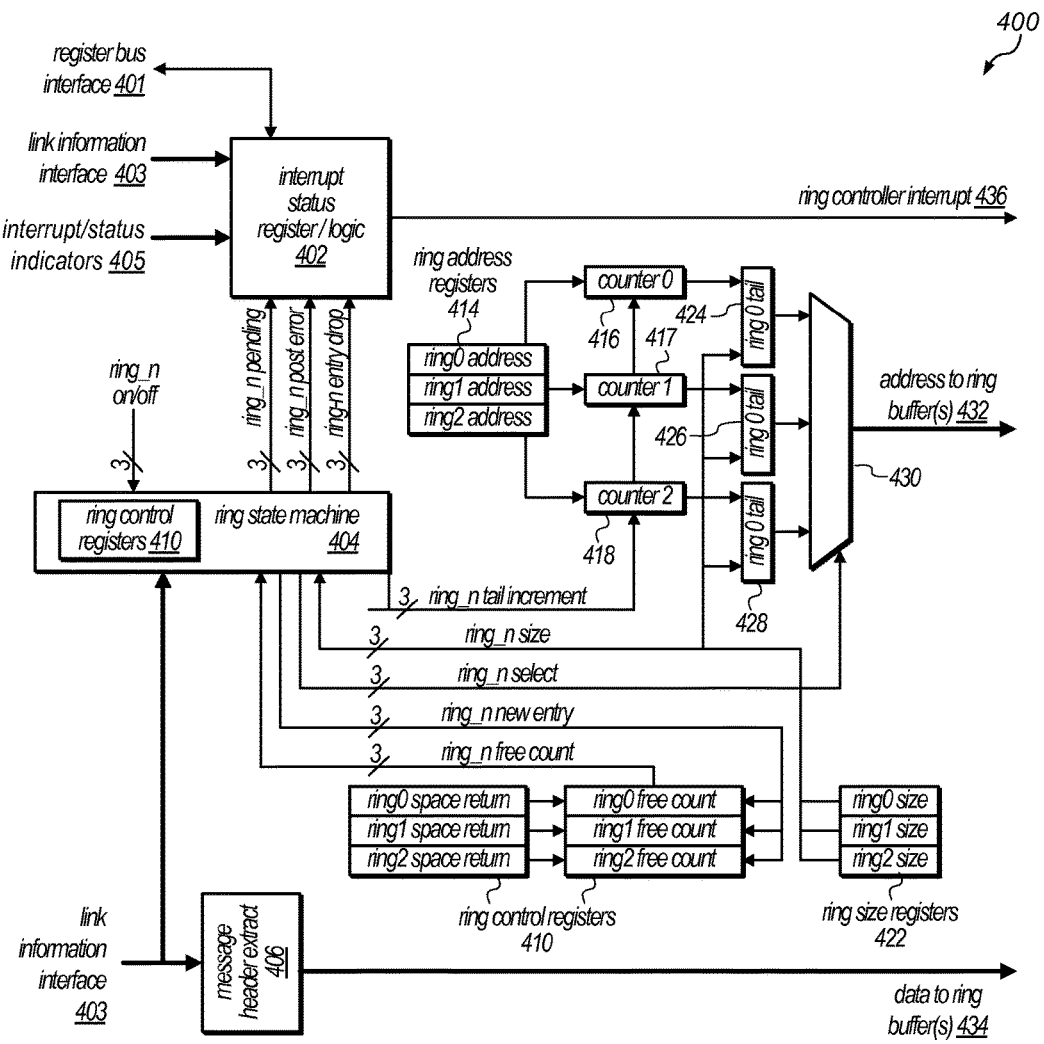
FIG. 4 is a block diagram illustrating one embodiment of a ring controller.

In some embodiments of the systems described herein there may be n processing nodes within a hierarchy that are physically separate, but that collectively implement a large and/or distributed application. In other embodiments, the nodes within the hierarchy may perform operations independently of each other on behalf of one or more executing applications. Note that while the techniques described herein are presented in the context of a single root hierarchy, in other embodiments they may also be applicable in other contents. As illustrated in this example, each of the endpoint devices may include a respective ring controller (shown as ring controllers 328-334), which may include hardware to support the use of ring buffers in handling messages received by the corresponding endpoint device. One example embodiment of a ring controller is illustrated in FIG. 4 and described below. As described herein, these ring controllers may, in some embodiments, be configured during initialization of the hierarchy by processes running on root complex 304.

As noted above, the root complex may include a device driver for each endpoint device, which may facilitate communication between the root complex (e.g., for use in initialization and setup operations and/or for use in exception handling, in some cases).

Note that, in some embodiments of the systems described herein, each endpoint on the fabric (e.g., each endpoint on the PCIe fabric) is associated with an identifier (e.g., a routing identifier, or RID). In some such embodiments, for configuration cycles and/or other traffic that runs only run north and south between each endpoint and the root complex, the fabric switch may route traffic based on those identifiers. However, another addressing model that routes traffic based on PCI addresses may be used with communication traffic that can flow from endpoint-to-endpoint in a peer fashion, as well as from the root complex to a particular endpoint. In some embodiments, there may be multiple decoders of different decoder types within each PCI-to-PCI bridge that are set up (e.g., by the operating system running on the root complex) during the enumeration process, which also assigns bus numbers. In such embodiments, one type of decoder in each PCI-to-PCI bridge may be used for routing between devices based on their identifiers, and a separate decoder within each PCI-to-PCI bridge may determine the address of a message or request, and may know how to route the message or request to another PCI-to-PCI bridge (i.e., the PCI-to-PCI bridge associated with the recipient) based on that address.

In some embodiments of the systems described herein (including, for example, in a system that includes the PCIe hierarchy illustrated in FIG. 3), data and interrupt traffic flow may take place between the endpoint devices and the root complex. For example, the endpoint devices (including shared I/O endpoint 326) and the root complex 304 may communicate with each other through switch 302. In other embodiments, some data and/or interrupt traffic may be communicated between endpoint components directly over a peer-to-peer connection (through their respective PCI-to-PCI bridge components within switch 302, without passing through root complex 304).

In some embodiments, the endpoint devices in a PCIe hierarchy may be processing nodes that collectively executed distributed applications in a distributed processing node system. In other words, in some embodiments, a PCIe hierarchy may be used as the fabric to connect together a large number of nodes in a distributed node system. In these and other large and/or distributed systems, there may be one host (root complex) associated with a large number of endpoint devices in the same hierarchy. The node acting as the root complex may include all of the hardware necessary to perform the functions of an endpoint device or the root complex, in some embodiments. In some embodiments, all of the nodes in the PCIe hierarchy may include all of the hardware necessary to perform the functions of an endpoint device or the root complex, and may be software programmable by a system manager that selects which of the two modes each node is to operate in (i.e., as an endpoint device or as the root complex). In other embodiments, different ones of the nodes may explicitly be configured (e.g., in hardware) to function as either the root complex or an endpoint device in the hierarchy. In some embodiments, each of the endpoints may be given a task (e.g., a portion of a distributed application, such as a calculation to be performed, or another type of task) and may return a response. The node that is configured (or programmed) to act as the root complex may or may not perform calculations or tasks that are part of an executing application, but may be responsible for setting up the hierarchy, performing an enumeration, and/or performing other initialization operations for the PCIe hierarchy.

In at least some embodiments, the ring controller may provide, to one or more processor cores or other processing logic/circuitry, control plane information that is needed to maintain system operation. This information is generally outside of the normal data traffic that moves through the system to perform memory reads and writes on behalf of an executing application. One embodiment of a ring controller is illustrated by the block diagram in FIG. 4. Note that, in various embodiments, the ring controller illustrated in FIG. 4 may be a standalone component of a node in a switched fabric hierarchy or may be a subcomponent of a more general notification controller or other higher-level component of a node in a switched fabric hierarchy. In this example, ring controller 400, which may be included in a node acting as the root complex in a switched fabric hierarchy or as an endpoint device in a switched fabric hierarchy, includes interrupt status register/logic 402, a ring state machine 404, message header extraction logic 406, and an address multiplexer 430. Ring controller 400 also includes various registers and counters that may be used to configure and control three ring buffers for handling messages received by the node, some of which are described in more detail below. For example, ring controller 400 includes ring address registers 414, counters 416-418, ring tail address registers 424-428, ring size registers 422, and ring control registers 410 (portions of which are shown as distributed within ring controller 400. Note that a ring controller may include more, fewer, or different components than those illustrated in FIG. 4 and may support more, fewer, or different types of ring buffers (for different classes of messages), in different embodiments.

In at least some embodiments, some ring controller notifications may be signaled by an interrupt to the code executing on the processor. In this and other embodiments, status registers may reside in the ring controller (and/or in an interrupt subsystem thereof) that a processor (or processing logic/circuitry) can access to obtain event details. Other events may result in placing message information on a ring buffer in memory, as described herein.

Ring Controller Interfaces

As illustrated in FIG. 4, in some embodiments, the ring controller 400 may include an external local bus interface (shown as register bus interface 401). In some embodiments, logic included in the ring controller may be accessed by PCIe wire transactions or by various operations of an executing application (which may include, e.g., operations defined in a standard or customer library interface) through this interface, which may, for example, include 32-bit address and data busses. The ring controller 400 may also receive information of a variety of types through a link information interface (shown as link information interface 403). For example, PCIe message TLP headers may be carried on this interface, which may allow the ring controller to capture PCIe error messages and convey them to the processor core (or to other processing logic/circuitry on the node) for subsequent handling. In some embodiments, other types of link information that is provided by the PCIe link controller may also be carried on this interface. In some embodiments, the ring controller may write information to ring buffers that reside in external memory (e.g., to DDR memory or to another type of external DRAM) through a secondary master interface (port). This is illustrated in FIG. 4 by interfaces 432 (address to ring buffers) and 434 (data to ring buffers). Note that the ring controller may not need to read from the memory. Therefore, these interfaces are shown as unidirectional interfaces (outputs of ring controller 400). In other embodiments, they may be bidirectional interfaces.

Other interfaces to ring controller 400 may include multiple single wire signals and support status indicators that are inputs to the ring controller (e.g., inputs to interrupt status register/logic 402). These inputs (which may include interrupts from other system components, link fault information, or other inputs) may be input to ring controller 400 as part of interrupts/status indicator inputs 405 or link information interface 403, and/or over register bus interface 401, in some embodiments.

Message Rings

Some notifications may have larger information content and may occur at a high rate. These notifications may be in message form, some of which represent error conditions (error messages). As described in detail herein, messages may be placed on ring structures for subsequent servicing by the nodes. In some embodiments (e.g., in order to save power by minimizing SRAM use and in order to have flexible structures that, if necessary, can be adjusted in terms of their sizes and/or locations), those ring buffers may be located in main memory (e.g., DRAM). In at least some embodiments, a single ring controller architecture (within a ring controller 400) may be used to manage multiple ring buffers, as described herein.

In at least some embodiments, each ring buffer may be characterized by its size, its head address, and its tail address in memory. The initial tail address and the ring size may be communicated to the ring controller 400 for each ring buffer prior to operations starting. The ring controller 400 may deposit new entries at the current tail of the ring buffer. When the processor (or processing logic/circuitry) removes entries from the head address it may inform the ring controller (e.g., by updating a register) so that the ring controller can track the available ring space. Each ring buffer entry may be derived from a PCIe posted transaction (more specifically, a posted write that represents a message). Buffering may be placed in the ring controller for transactions that are received via the register bus interface 401 or link information interface 403. However, the bandwidth to memory and the ring size may allow that buffering amount to be small so that the return of posted credits to the link is not delayed, for example, by slow register bus interface handshaking Whenever a ring has contents that has not been removed by a processor (or processing logic/circuitry), a maskable interrupt (shown as ring controller interrupt 436) may be sent to the local processor's interrupt controller. In one example embodiment, each ring entry may include eight bytes, and one ring controller may be configured to manage N rings using N sets of head/tail/size (pointers). Each ring buffer may be mapped in the device's address space (e.g., in any portion of the memory address space that can be accessed by the processor chip) and may be written by the processor cores.

In the example illustrated in FIG. 4, ring controller 400 utilizes three ring buffers, each of which is configured to store incoming message TLP information for messages that have been classified (based on the message TLP information) as being a specific type of message. In one example, the messages stored in each of the three rings may be classified as follows:

ring0: non-error message TLP information
ring1: non-correctable error message information (for both fatal and non-fatal errors)
ring2: correctable error message information Note that, in other embodiments, a ring controller may utilize more or fewer ring buffers, into which information about messages of more, fewer, or different message types may be stored following their classification by the ring controller. Although the three rings described above may be initialized for both endpoints and the root complex, an endpoint may only need ring0, as the receipt of an error message by an endpoint may not be allowed (e.g., this is a violation of the PCIe protocol). In some embodiments, a switch may never direct error messages to an endpoint. In some embodiments, the filtering logic of the PCIe link controller may be configured to block certain messages (e.g., specific types of VDM messages or other types of non-error messages) from reaching the link information interface 403, while in other embodiments, they may be delivered to the ring controller (e.g., on an endpoint) and subsequently written out to one or more ring buffers. In some embodiments, the incident rate of messages on ring1 (non-correctable error messages) may be low. However, the corresponding events may be critical and (in many cases) processing may have stopped on the device that sent the error message. A working system may also have a very low incident rate of messages on ring2 (correctable error messages). However, a PCIe link with signal integrity problems may produce many such correctable error messages in bursts or over a length of time. As these are correctable errors, it may be important that a storm of these errors does not cause loss of a non-correctable error or informational message. Thus, correctable errors may be placed on a separate ring from non-correctable errors in case processing does not keep up with the message incident rate and the error information for multiple such messages needs to be maintained until the processor core (or other processing logic/circuitry) can process it.

Ring Entry Format

As noted above, in some embodiments, each ring entry may include eight bytes. These entries may be 8-byte aligned in external memory. In some such embodiments, only the first eight bytes of the message may be captured, while the data associated with each of the messages may be dropped. In one embodiment, the format of the data is that defined for message request headers in the PCIe Base Specification, with byte0 containing format and type fields and byte7 containing the message code.

In other embodiments (or, e.g., in ring buffers that store information about VDMs), each entry in a ring buffer may be larger than eight bytes. For example, each entry may include some of the data that was contained in the corresponding message and/or more than eight bytes of information that was extracted from the packet header.

As previously noted, a situation can sometimes arise in which an error condition results in the creation of thousands of messages in a short time interval. For example, there may be a link with a signal integrity issue that leads to a repeated correctable error condition, and a huge number of TLPs representing that error condition may be sent to the root complex. In this example, the repetitive error messages may provide little additional value and may be detrimental if the rate at which software processes the messages is slower than the rate at which new messages arrive. This may cause ring overflow and a potential loss of a correctable error message from a different device. Note that, in some embodiments, if one of the ring buffers is full when a message of the type that it stores is received, rather than dropping the message, an entry in the ring buffer may be overwritten with information about the most recently received message. In some such embodiments, the ring controller may notify the processor core (or other processing logic/circuitry) that the ring is out of space. In other embodiments, if one of the ring buffers is full when a message of the type that it stores is received, the recently received message may be dropped and, in some cases, the processor (or processing logic/circuitry) may be notified that the ring buffer is full. In either case, a notification that the ring buffer is full may provide the processor (or processing logic/circuitry) with data to inform a decision about whether to increase the size of a particular ring buffer.

In some embodiments, some non-error message TLPs may be dropped (e.g., automatically and silently) by the ring controller on the root complex and/or on an endpoint rather than being placed on one of the ring buffers by the ring controller. In other embodiments, at least some non-error message TLPs (e.g., VDMs that are received by endpoints and/or Power Management Event (PME) messages) may be handled by the ring controller on the recipient node, as described herein. In some embodiments, certain types of error message TLPs may be dropped (e.g., automatically and silently) by the ring controller on the root complex and/or on an endpoint rather than being placed on one of the ring buffers by the ring controller.

In some embodiments, pre-processing operations and/or filtering logic on the node (or in its ring controller) may provide flexibility in message filtering and associated error handling, in some cases (e.g., allowing the node to drop or process these messages, as desired). Note that, in addition to ring controller interrupts, other functional blocks may request interrupt servicing from the node. In some embodiments, these may use interrupt signals only, and no event message may be received by the processor or written out to a ring buffer in external memory for these interrupts.

Ring Controller Registers

In at least some embodiments, various registers that reside in and/or are used by the ring controller may be accessed by the slave interface through an interface of the PCIe link controller. Some of these registers are illustrated in FIG. 4 and described below.

Interrupt Status Register/Logic

In some embodiments, the processor core (or processing logic/circuitry) on a given node may read the interrupt status register/logic 402 in its process of determining the cause of an interrupt it has received, and attribute bits that correspond to interrupts can be cleared from this register. Those with read-only attributes (that are not solely informational) may be cleared from their respective source registers. Interrupts masked by the interrupt mask may still result in the corresponding status bit being set upon the condition, but an interrupt may not be issued to the processor interrupt controller.

In various embodiments, the values of different fields within the interrupt status register may indicate, among other conditions, some or all of the following (each of is associated with a corresponding input to interrupt status register/logic 402, as shown in FIG. 4):

Pending entries on a particular one of the ring buffers

A posting error on a particular one of the ring buffers

A drop condition in a particular one of the ring buffers

In some embodiments (e.g., in embodiments in which interrupt status register/logic 402 functions as the overall interrupt controller for the device), the interrupt status register may include fields whose values indicate interrupts received from other functional components, link status information, and/or other types of error conditions. The interrupt mask register may be a register with a bit corresponding to each bit in the interrupt status register. A set mask bit may prevent the corresponding interrupt status bit from causing an interrupt to any processor. Note that, in some embodiments, interrupt status register/logic 402 may be a standalone component within the node, rather than a subcomponent of ring controller 400, or may be a subcomponent of a component of the node other than ring controller 402.

Ring Controller Registers

In some embodiments, each of the ring buffers is associated with a respective ring control register 410, and these ring control registers may be present in both root complex and endpoint configurations. Various fields within each of the ring control registers 410 may be used to turn different ones of the ring buffers on/off and to tell the rings how many entries have been processed when reading from the rings. For example, one of the bits may indicate whether the corresponding ring buffer is on or off, and the ring controller may write entries to the corresponding ring buffer in external memory when this bit is set. If the bit is clear, incoming messages that would otherwise have been directed to the corresponding ring buffer may be silently dropped. Other bits in this register (e.g., up to 25 bits) may indicate the number of ring buffer entries that have been processed. For example, the processor may write the number of entries it has processed into this field. In some embodiments, if the software writes a value that that is larger than the value in a corresponding field of the ring status register described below, this may be an error condition that results in turning off this ring's operation, setting an indication of a posting error for this ring in the ring status register, and issuing a maskable interrupt (shown as ring controller interrupt 436) to the local processor.

As illustrated in FIG. 4, in some embodiments, other fields in each ring control register 410 (or in another control register for each ring buffer) may include fields representing: the return of space in one of the ring buffers (which, when written to may increment the free count for that ring buffer), and the free count for one of the ring buffers (which provides the current number of available ring buffer entries to ring state machine 404 and which may be decremented when a new entry is added to the ring buffer).

Ring Base Address Registers

As illustrated in FIG. 4, a respective base address register 414 that is associated with each ring buffer may be used to set the starting address of the corresponding ring buffer in memory. These must be written before enabling the ring buffers for use, as described above. In some embodiments, regardless of the processor's address space, the ring controller registers 410, including the ring base address registers 414, may be 32 bits wide. In some such embodiments, the memory space may be no larger than 32 GB, and register entries for the memory addresses may reflect a 35-bit memory address space. For example, in one embodiment, the 32 bits of the ring base address register 414 for each ring buffer may be read/write and may represent bits [34:03] of the memory address location at which software places the base of the ring buffer. Bits [02:00] of the memory address may implicitly have values of zero, when each ring entry is 8-byte aligned in external memory. Note that in some embodiments, bit 35 may be set to 0 by hardware so that the access is to the external memory.

Ring Size Registers

In some embodiments, the ring size registers 422 (e.g., one for each ring) may control the size of the corresponding ring buffer in memory (e.g., up to 256 MB). Each of these registers must be set before enabling the corresponding ring buffer for use. In one example, bits [24:00] of this register may indicate the ring size, and bits [31:25] may be unused (or reserved). In some embodiments, software may write the number of 8-byte entries the ring will contain into this register. In this example, the largest ring buffer size may be a ring buffer having 32M entries that consume a 256 MB footprint. The smallest supported ring buffers may be on the order of 64 entries.

Note that, in some embodiments, the ring buffer structure described herein may allow for a head/tail pointer implementation that consists of increasing the values of counters (shown as 416, 417, and 418) whose initial and lowest values are written into the corresponding ring base address register 414. In such embodiments, the pointers may be incremented until they reach a terminal value of (Ring_Base_Address+Ring_Size). The next increment may result in a pointer value equal to Ring_Base_Address.

Ring Head Pointer Register

In some embodiments, 32-bit ring head pointer registers (one for each ring) may be read-only registers used to tell software the head pointer location for the respective rings. The value in each of these registers multiplied by 8 may equal the address of the current head of the corresponding ring buffer in memory. In other words, this register's value, multiplied by 8, may represent the external memory address that a processor (or processing logic/circuitry) reads to access information pertaining to an incoming message TLP. This pointer may be incremented by the amount the processor (or processing logic/circuitry) writes into the entries processed field of the corresponding ring control register (which may primarily by used for diagnostic purposes). In some embodiments, when a ring buffer on/off control bit transitions to 1, the corresponding ring head pointer register may be initialized to Ring_Base⁻ Address.

Ring Tail Pointer Registers

In some embodiments, the ring tail pointer registers (one for each ring buffer, shown as 424, 426, and 428) may be read-only registers whose values indicate the current position of the corresponding ring buffer's tail pointer. In some such embodiments, software may pull data from the head of the ring buffer while the ring controller adds data to the tail of the ring buffer. This value in the ring tail pointer register multiplied by 8 may represent the address at which software stops pulling data from the ring. This value, in conjunction with the "entries pending" field in the ring status register, may be used to identify where and how many entries can be read.

Ring Status Registers

In some embodiments, these registers (one for each ring buffer) may contain various status fields for the corresponding ring buffer. In some embodiments, these registers may be implemented within ring state machine 404, or within another component of ring controller 400. These fields may represent, for example:

- A FIFO full status indicator (e.g., a single bit that, when set, indicates that the 8 entry FIFO between the ring controller and master is full, in which case the message may be dropped and/or an interrupt may be issued).
- A memory ring full indicator (e.g., a single bit that, when set, indicates that no space is available on the ring buffer in external memory for an incoming message, in which case the message may be dropped and/or an interrupt may be issued).
- A posting error status indicator (e.g., a single bit that is set if software attempts to write an invalid value into the entries processed field of the ring control register, in which case an interrupt may be issued). Note that an invalid write attempt may be blocked by hardware, in some embodiments.
- The number of entries pending on the ring (e.g., a 25-bit field whose value indicates the number of entries on the ring buffer that software has not yet processed).

Figure 5:
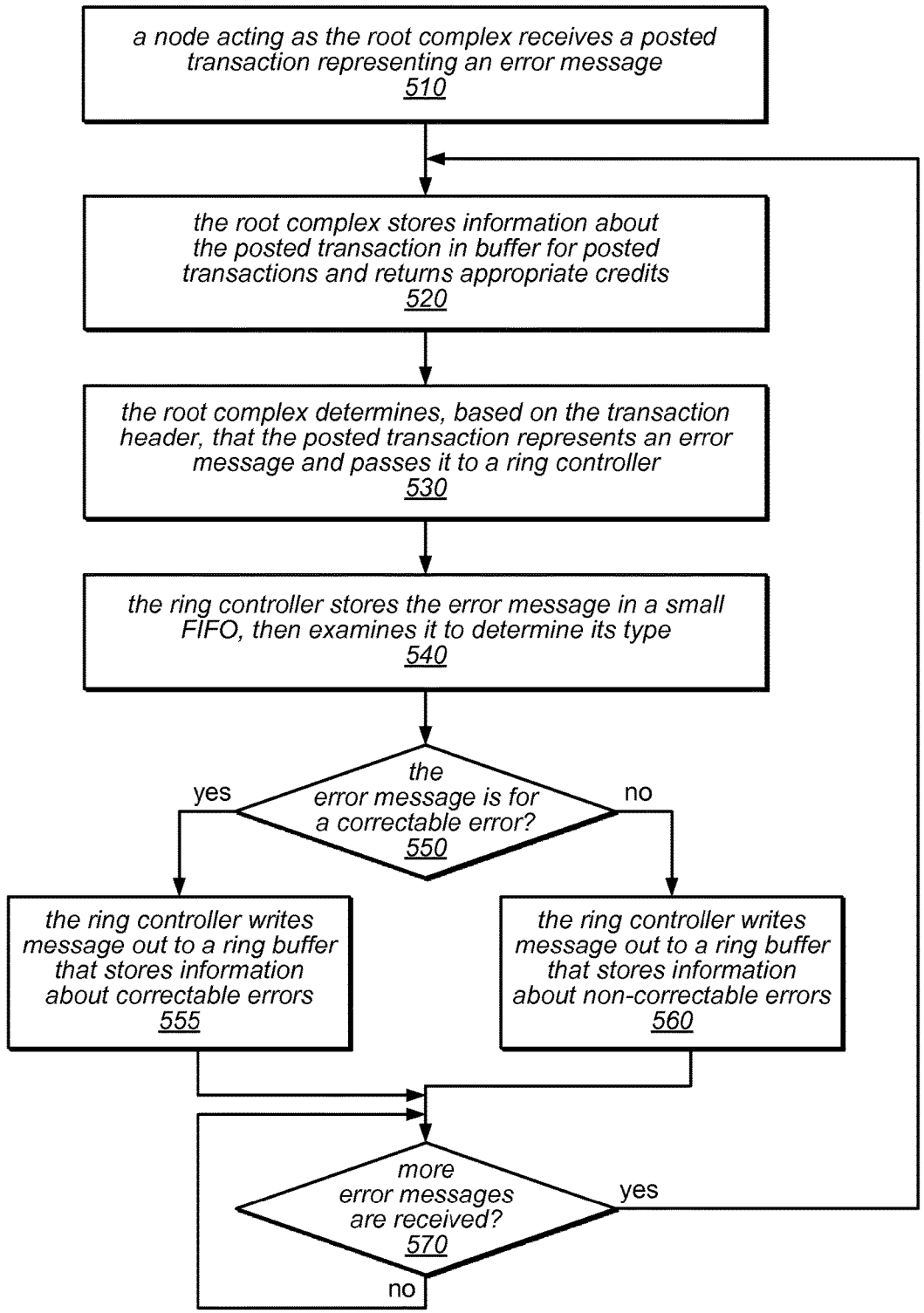
FIG. 5 is a flow diagram illustrating one embodiment of a method for handling error messages in a switched fabric hierarchy (such as a PCIe hierarchy).

One embodiment of a method for handling error messages in a switched fabric hierarchy (such as a PCIe hierarchy) is illustrated by the flow diagram in FIG. 5. As illustrated at 510, in this example, the method may include a node that is acting as the root complex in a switch fabric hierarchy receiving a posted transaction representing an error message. For example, the posted transaction may be received from an endpoint device in the switched fabric hierarchy or from another component in the system through an incoming packet interface such as the incoming packet interface 110 illustrated in FIG. 1. The method may include the root complex storing information about the posted transaction in a buffer for posted transactions (such as posted transactions buffer 115 in FIG. 1) and returning the appropriate credits, as in 520. The method may also include the root complex determining, based (at least in part) on the transaction header, that the posted transaction represents an error message, and passing the message to a ring controller that is implemented on the root complex, as in 530.

As illustrated in this example, the method may include the ring controller storing the error message in a small FIFO (such as message FIFO 130 in FIG. 1), and then examining it to determine its type, as in 540. If the error message is for a correctable error (shown as the positive exit from 550), the method may include the ring controller writing the message out to a ring buffer that stores information about correctable errors for subsequent processing by the root complex (as in 555). For example, in some embodiments, the ring controller may write information about the message to a location in main memory whose address is identified by the value currently stored in a tail pointer for that particular ring buffer.

If the error message is not for a correctable error (shown as the negative exit from 550), the method may include the ring controller writing the message out to a ring buffer that stores information about non-correctable errors for subsequent processing by the root complex (as in 560). For example, in some embodiments, the ring controller may write information about the message to a location in main memory whose address is identified by the value currently stored in a tail pointer for that particular ring buffer. Note that in some embodiments, one ring buffer may be used to store both fatal and non-fatal non-correctable errors, while in others, the ring controller may support two separate ring buffers for storing non-correctable errors (one for fatal errors and one for non-fatal errors). In either case, if and when more messages are received (shown as the positive exit from 570), the method may include repeating at least some of the operations illustrated in 520-560 (as applicable) for each additional message (e.g., regardless of whether or not any or all of the previously received messages have already been processed).

As previously noted, in some embodiments, a ring controller within an endpoint may be configured to store one or more types of vendor-defined messages in one or more ring buffers (e.g., in external memory). In some embodiments, all such VDMs may be placed on a single ring buffer, while in other embodiments, different types of VDMs (e.g., VDMs having different encodings in their packet headers) may be placed on different ring buffers for subsequent processing. In some embodiments, not all of the ring buffers that are supported by the ring controller may be used on endpoints. For example, since endpoints cannot receive message representing non-correctable errors or correctable errors, any ring buffers configured to store those types of messages may be unused. In some embodiments, hardware within the ring controller may examine particular fields within packets that represent VDMs and may be configured to place them on particular ring buffers depending on the contents of those fields (e.g., based on the contents of fields within the headers and/or based on the content of the messages, in some cases). If the relevant fields within the header and/or message contents of an incoming message do not match any of the VDM classification criteria, the message may not be placed on one of the ring buffers, and may be discarded without further processing.

In some embodiments, the classification criteria for VDMs may be programmable by software such that a custom matching function may be performed by the hardware within the ring controller. In such embodiments, in addition to examining the PCIe header for a VDM (which may identify a posted write as a VDM), the ring controller may be configured to examine lower level encodings inside the packet or deeper inside of the packet header (where there are user-definable fields that may be meaningful in the particular system or for a particular type of endpoint). If the hardware determines that there is a match within those fields for the VDM classification criteria that it has been configured to support, the ring controller may place the message on a particular ring buffer for subsequent processing. In some embodiments, there may be a programmable register within the ring controller that specifies a particular (field, value) encoding that identifies the message as one that is of interest to the system (and that should therefore be saved on a ring buffer). Note that, in some embodiments, the ring controller may support multiple ring buffers that store VDMs, and different classification criteria may be hard-wired and/or programmed for each of them.

Figure 6:
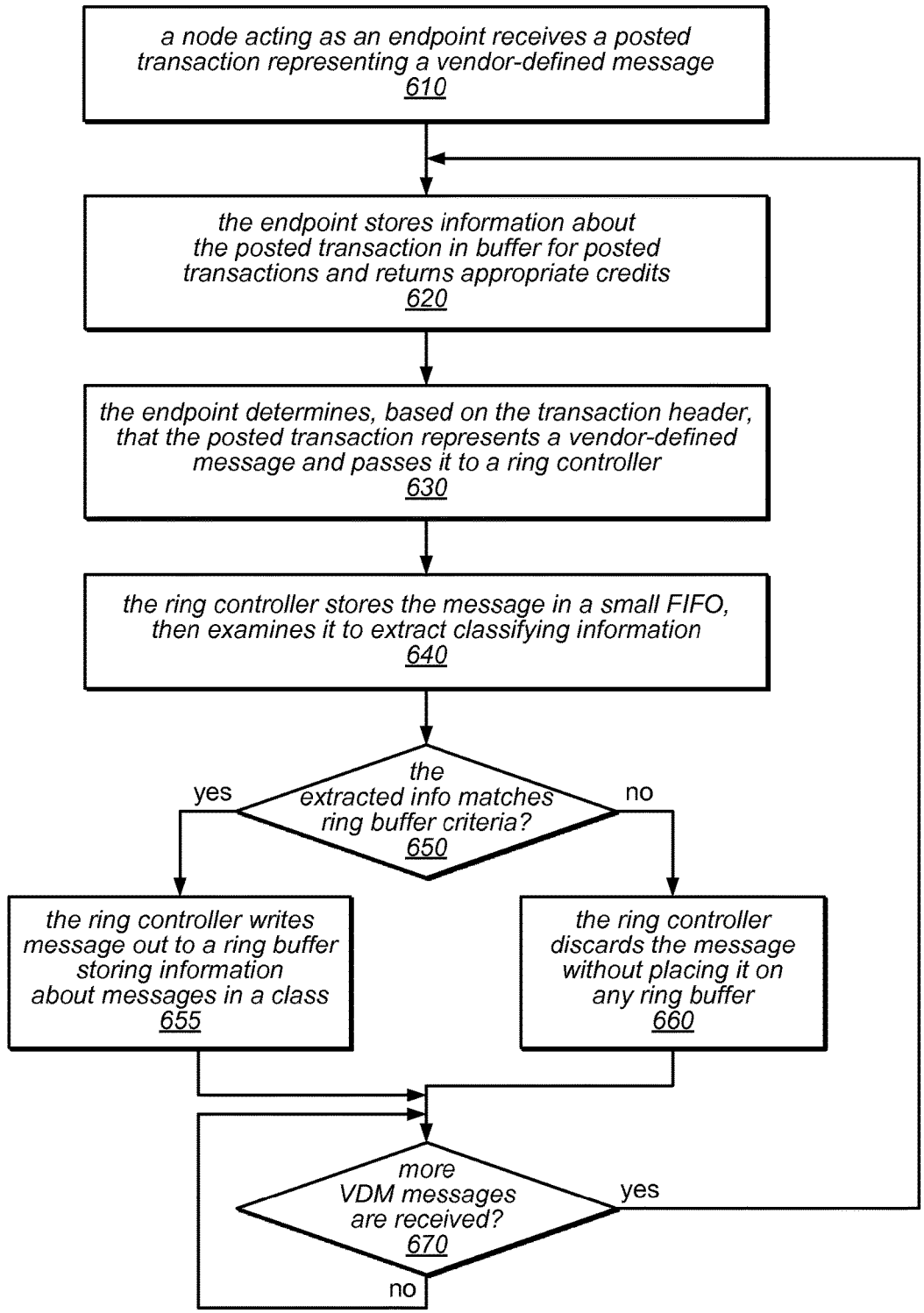
FIG. 6 is a flow diagram illustrating one embodiment of a method for handling vendor-defined messages in a switched fabric hierarchy (such as a PCIe hierarchy).

One embodiment of a method for handling some non-error messages (specifically, vendor-defined messages) in a switched fabric hierarchy (such as a PCIe hierarchy) is illustrated by the flow diagram in FIG. 6. As illustrated at 610, in this example, the method may include a node that is acting as an endpoint in a switch fabric hierarchy receiving a posted transaction representing a vendor-defined message. For example, the posted transaction may be received from the root complex component in the switch fabric hierarchy through an incoming packet interface such as the incoming packet interface 110 illustrated in FIG. 1. The method may also include the endpoint storing information about the posted transaction in buffer that is configured to store information about posted transactions (such as posted transactions buffer 115 in FIG. 1) and returning the appropriate credits, as in 620. The method may include the endpoint determining, based (at least in part) on the transaction header, that the posted transaction represents a vendor-defined message, and passing the message to a ring controller that is implemented on the endpoint, as in 630.

As illustrated in this example, the method may include the ring controller storing the message in a small FIFO (such as message FIFO 130 in FIG. 1), and then examining it to extract classifying information from the packet header and/or message content, as in 640. If the extracted information matches the message classification criteria for any of the ring buffers supported by the ring controller (shown as the positive exit from 650), the method may include the ring controller writing the message out to a ring buffer that stores information about vendor-defined messages in a particular class of such messages for subsequent processing by the endpoint, as in 655. For example, in some embodiments, the ring controller may write information about the message to a location in main memory whose address is identified by the value currently stored in a tail pointer for that particular ring buffer. As previously noted, in some embodiments, there may be a single ring buffer into which VDMs are placed, while in other embodiments, multiple ring buffers (having different classification criteria) may be managed by the ring controller.

If the extracted information does not match the message classification criteria for any of the ring buffers supported by the ring controller (shown as the negative exit from 650), the method may include the ring controller discarding the message without placing it on any of the ring buffers, as in 660. In either case, if and when more vendor-defined messages are received (shown as the positive exit from 670), the method may include repeating at least some of the operations illustrated in 620-660 (as applicable) for each additional message (e.g., regardless of whether or not any or all of the previously received messages have already been processed). Note that while the example illustrated in FIG. 6 describes the classification of VDMs, a similar approach may be applied to classify other types of non-error messages (e.g., informational messages) and to store them in corresponding ring buffers for subsequent examination and/or processing, as appropriate.

In some embodiments, the size of various ring buffers may be adjusted during development of the nodes (e.g., based on the observed workloads and the corresponding types/frequencies of different types of messages that are received by both the endpoints and the root complex). For example, there may be some experimentation during development that results in the ring buffers being set up based on the amount of spare memory that is available, the workload observed during such experimentation, how much capacity is expected to be needed for different types of message, and/or based on the type of workload that the processor (or processing logic/circuitry) is expected to handle. In other embodiments, the size of various ring buffers may be adjusted during operation (e.g., in response to receiving repeated indications that one or more of the ring buffers fills up during operation). For example, in some embodiments, the ring controller may provide information to the process to allow it to keep track of how much room is available in each of the ring buffers and if one or more of them are running out of space, the processor (or processing logic/circuitry) may write to the appropriate registers for those ring buffers to increase their size in the external memory.

In some embodiments, messages that have been placed in various ones of the ring buffers supported by the ring controller on a given node (e.g., the root complex or an endpoint) may be retrieved from the ring buffer for processing according to a priority scheme for these buffers. For example, correctable errors may have lower priority than non-correctable errors. In addition, there may be other differences in the relative priorities that are associated with different ones of these ring buffers. Note that, in different embodiments, there may be a different interrupt for each of the ring buffers, or there may be a single interrupt from the ring buffers to the processor (or processing logic/circuitry) that and an indication inside an interrupt status register that tells the processor (or processing logic/circuitry) which of the ring buffers is sending the interrupt. In systems in which some types of messages have a higher priority than others, the processor (or processing logic/circuitry) may drain the highest priority ring buffer first before it retrieves and processes message from the next highest priority ring buffer. In at least some embodiments, software running on the host may wait for interrupts, and then may handle the types of messages that generated the interrupts as needed (as they come along), according to the priority scheme implemented in the system.

Figure 7:
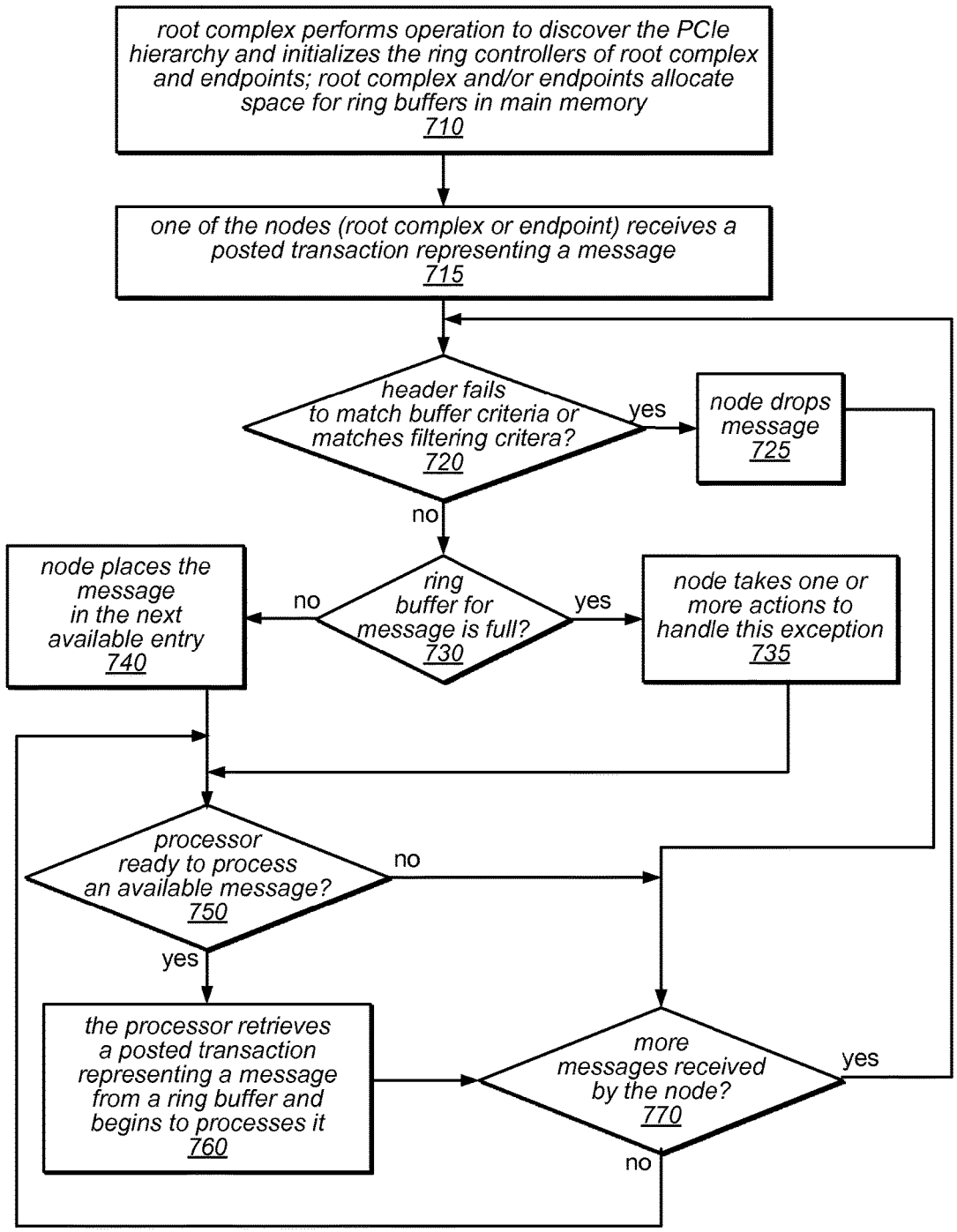
FIG. 7 is a flow diagram illustrating one embodiment of a method for utilizing a ring controller portion thereof) in handling various messages in a switched fabric hierarchy.

One embodiment of a method for utilizing a ring in handling various messages in a switched fabric hierarchy (e.g., in a PCIe hierarchy) is illustrated by the flow diagram in FIG. 7. As illustrated at 710, in this example, the method may include a root complex component of a PCIe hierarchy performing an operation to discover the PCIe hierarchy and to initialize respective ring controllers of the root complex component and one or more endpoints in the PCIe hierarchy. The initialization may include the root complex and/or endpoints allocating space (of a particular size) for various ring buffers in main memory at particular locations, initializing associated counters, and initializing head and/or tail pointers for each ring buffer, according to the value programmed in different ones of the registers within the ring controller, as described herein.

The method may include one of the nodes (e.g., a node acting as the root complex or as an endpoint) receiving a posted transaction representing a message (e.g., an error message or a non-error message), as in 715. If the header information in the posted transaction fails to match the classification criteria for any of the ring buffers or if the header information matches criteria for messages that are to be filtered out (shown as the positive exit from 720), the method may include the node dropping the message, as in 725. Otherwise, if the header information in the posted transaction matches the classification criteria for one of the buffers and does not match criteria for messages that are to be filtered out (shown as the negative exit of 720), and if the ring buffer that is configured to store messages in the same class as the recently received message is full (shown as the positive exit from 730), the method may include a processor (or processing logic/circuitry) on the node taking one or more actions to handle this exception condition (as in 735). For example, the processor (or processing logic/circuitry) on the node may drop the most recently received message, may overwrite an existing entry in the ring buffer with the recently received message, and/or may increase the size of the ring buffer in response to determining that the ring buffer is full, in different embodiments. For example, in some embodiments, if the ring buffer fills up, a notification may be sent to the processor (or processing logic/circuitry), which may (in turn) allocate more space for the ring buffer. In some embodiments, a separate process running on each node may be configured to check the status of each ring buffer (e.g., from time to time or in response to an event notification) and to determine whether its size should be increased.

If the header information in the posted transaction matches the classification criteria for one of the buffers and does not match criteria for messages that are to be filtered out (shown as the negative exit of 720), and if the ring buffer that is configured to store messages in the same class as the recently received message is not full (shown as the positive exit from 730), the method may include a processor (or processing logic/circuitry) on the node placing the message in the next available entry of that ring buffer (as in 740).

At some point, if a processor (or processing logic/circuitry) on the node is ready to process a message (e.g., any of the messages that it has received, that have been written out to one of the ring buffers, and that have not yet been processed, if any exist in the ring buffers), shown as the positive exit from 750, the method may include the processor (or processing logic/circuitry) retrieving one of the posted transactions representing a message from one of the ring buffers and beginning to processing it, as in 760. Note that, in various embodiments, the selection of a posted transaction (message) to process (from among all of the posted transactions for which information is stored in any of the ring buffers) may be dependent on a priority scheme (e.g., based on the relative priority of different message types) and/or may be based on FIFO ordering (e.g., popping an element identified by the head pointer of a particular ring buffer) or using other criteria.

If the processor (or processing logic/circuitry) on the node is not ready to process any of the messages that it has received and that have been written out to one of the ring buffers (or if there are no messages available to be processed), shown as the negative exit from 750 (or after the processor has retrieved and begun processing one of the messages as in 760), if more messages are received, the method may include repeating at least some of the operations illustrated in 720-760 (as applicable) for each additional message (e.g., regardless of whether or not any or all of the previously received messages have already been processed).

In some embodiments, the techniques described herein for handling PCIe messages using a ring controller (e.g., ring controller functionality implemented within a ring controller) may be implemented in an aggressive scale-out distributed database architecture that contains many processing nodes (e.g., over a thousand nodes) in a single rack. As previously noted, reliability, availability, and serviceability (RAS) attributes may be critical in systems of this size, and commonly used industry approaches do not scale to meet the needs of a system of this scale. In some embodiments, the systems in which these techniques are implemented may include multiple hierarchies of processing nodes, each containing a single root complex and multiple endpoints.

As previously noted, error management software needs adequate information in order to take appropriate action when a node exhibits any type of error, and the loss of an error message (e.g., should multiple nodes in a hierarchy issue an error at substantially the same time) may be unacceptable for this class of machine. The techniques described herein may provide error management software with better opportunities to determine the underlying faults in the PCIe hierarchy, since a full, more complete record of events may be preserved than in conventional systems. Better RAS decisions may thus be made, which may limit the number of nodes that may need to be taken off-line or restarted in response to those errors. In embodiments in which the ring buffer locations and sizes are programmable, the user may have flexibility to choose where best to place message rings and their size. For example, the use of external DRAM may allow the system to make the message rings as large as needed, where local SRAM would be limited in size. Thus, there is a lower risk that any messages will be missed. The flexible register-based approach described herein may easily scale as the number of nodes increases, due to the use of large external storage for the message information. Since ring buffer sizes and memory locations may both be programmable and may be adjustable after the system is in the field, the PCIe hardware may be optimized for the application after the system has been built. While these techniques are describe herein in terms of systems that have a large number of PCIe nodes and high RAS requirements, they may also be applicable in systems with high broadcast message traffic.

Note that, while several of the examples described herein include ring structures that are configured to store PCIe messages of different types, in other embodiments, other types of data structures may be configured to store these messages. For example, messages may be stored in linear FIFOs, or in more complex data structures (e.g., linked lists). Note also that, while these techniques have been described herein in terms of a PCIe interconnect fabric, in other embodiments, they may be applied in systems that employ a different type of interconnect fabric. For example, they may be applicable in any system that include different classifications of traffic and a mechanism by which errors or other exception types of traffic need to be processed but in which there are limited resources that are allocated in the system architecture for those situations. In various embodiments, they may be implemented in systems in which there is a switched fabric on which multiple devices have the potential to generate large numbers of errors or other types of exception-related traffic that must be handled by a central notification controller or ring controller on one node in the fabric.

The techniques described herein for implementing ring controllers for handling messages within a switched fabric hierarchy may be applied in any of a variety of system architectures, in different embodiments. In one example, the system may implement a distributed database architecture in which the overall performance is dependent on the interconnect bandwidth between processing nodes. In this example, the system may include a hybrid interconnect fabric consisting of a PCIe fabric and a fabric that is compliant with the InfiniBand™ standard developed by the InfiniBand Trade Association, and one of the endpoints (a shared I/O device) may be a PCIe-to-InfiniBand host channel adaptor. In other embodiments, any system that includes a large number of PCIe endpoint devices may benefit from the techniques described herein.

Example System

Figure 8:
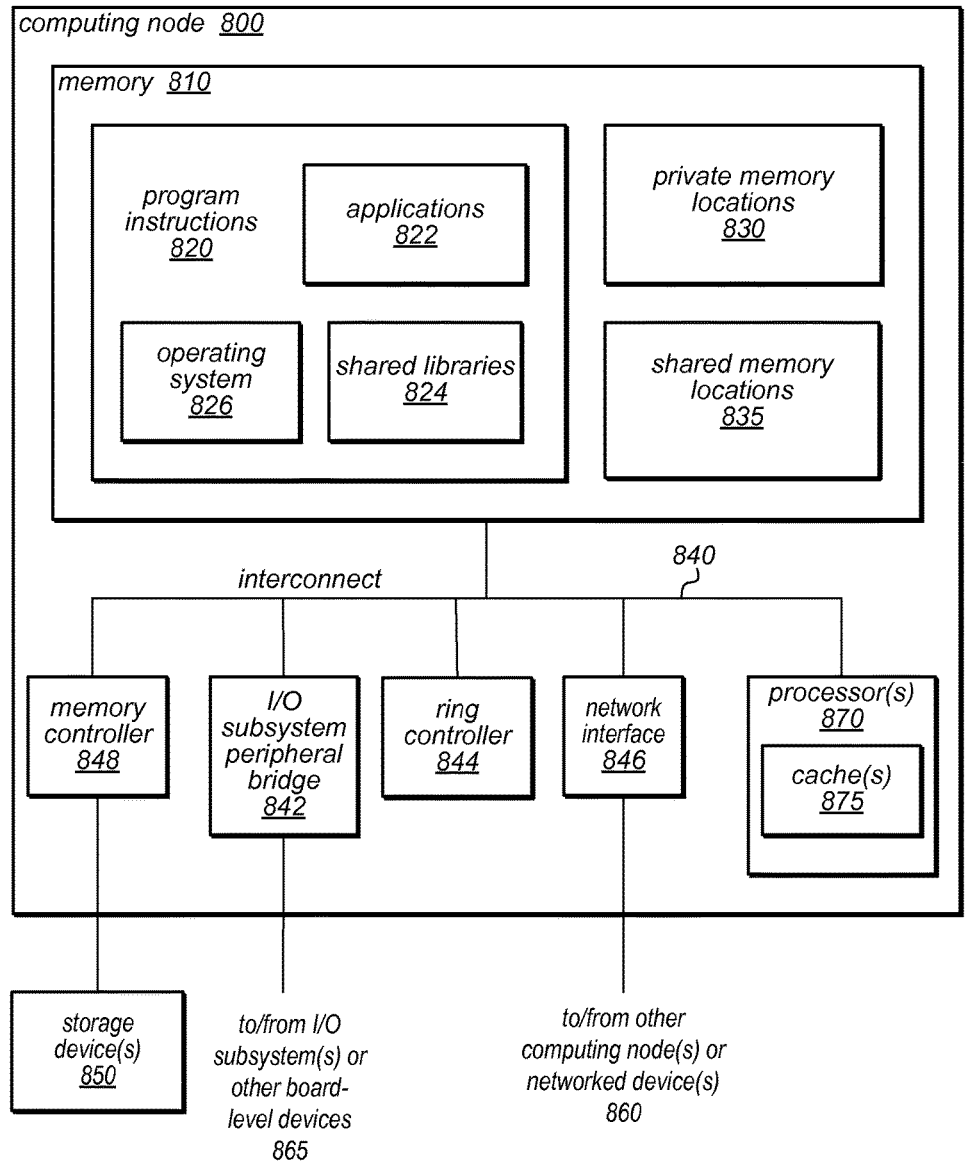
FIG. 8 illustrates a computing node that is configured to implement at least some of the methods described herein, according to various embodiments.

FIG. 8 illustrates a computing node that is configured to implement some or all of the methods described herein, according to various embodiments. The computing node 800 may be (or may be a component of) any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computing node 800 may be one of a plurality of computing nodes or other components in a switched fabric hierarchy, as described herein. For example, computing node 800 may represent a shared I/O device, an endpoint node, or a node configured as the root complex for a particular hierarchy of nodes, or may implement some or all of the functionality of a network or fabric switch, in different embodiments.

Some of the functionality for utilizing a ring controller in handling various messages in a switched fabric hierarchy (e.g., for handling PCIe messages of various types in a PCIe hierarchy), as described herein, may be provided as (or invoked by) a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 800 may include one or more processors 870; each may include multiple cores, any of which may be single or multi-threaded. For example, multiple processor cores may be included in a single processor chip (e.g., a single processor 870), and multiple processor chips may be included on a CPU board, two or more of which may be included in computing node 800. In various embodiments, one or more of the processors 870 may be (or include) a special-purpose processor core. Each of the processors 870 may include a cache 875 or a hierarchy of caches, in various embodiments. As illustrated in this example, computing node 800 may include a memory controller 848 and/or a network interface 846 (which may implement an interface according to the PCIe standard or another switched fabric interface, in some embodiments). Computing node 800 may also include one or more I/O subsystem peripheral bridges 842 (which may include, or may provide an interface to a subsystem that includes, a PCI-to-PCI bridge), and a ring controller 844

(which may include circuitry for implementing all or a portion of the functionality of the ring controllers described herein).

As illustrated in FIG. 8, computing node 800 may also include or have access to one or more persistent storage devices 850 (e.g. optical storage, magnetic storage, hard drive, tape drive, solid state memory, etc., that is external to, but accessible by, computing node 800), and one or more system memories 810 (e.g., one or more of cache, SRAM, DRAM, RDRAM, EDO RAM, DDR 10 RAM, SDRAM, Rambus RAM, EEPROM, etc.). In some embodiments, system memory 810 may store a portion of a data set for an application on which processor(s) 870 may operate locally. For example, memory 810 on computing node 800 may include local storage (e.g., within private memory locations 830 or shared memory locations 835) for data structures, elements of which may be the targets of various functions of an executing application, portions of which execute on computing node 800. In some embodiments, memory 810 may include persistent storage (e.g., for storing firmware or configuration parameter values that are fixed for a given computing node or a given set of configuration registers, some of which may control various functions of ring controller 844). In other embodiments, configuration registers or configuration parameters stored in system memory 810 may be programmable (e.g., at runtime). Various embodiments of computing node 800 may include fewer or additional components not illustrated in FIG. 8 (e.g., video cards, audio cards, additional network interfaces, peripheral devices, a network interface such as an ATM interface, an Ethernet interface, a Frame Relay interface, etc.)

In this example, the one or more processors 870, the memory controller 848 (which may provide access to storage devices 850), the I/O subsystem peripheral bridges 842 (which may provide access to an I/O subsystem such as the switched fabric hierarchy illustrated in FIG. 3, and/or to other board-level interconnect-based devices, shown as 865), ring controller 844, the network interface 846 (which may provide access to other computing nodes or networked devices 860 in the system), and the system memory 810 may be coupled to the system interconnect 840. In some embodiments, various ring buffers (or other data structures) that are configured to store messages of different types on behalf of computing node 800 and/or other computing nodes may reside on storage devices 850 or within memory 810. One or more of the system memories 810 may contain program instructions 820. Program instructions 820 may be executable to implement one or more applications 822 (which may include a portion of an executing application that accesses a shared I/O device in order to perform various physical or virtual functions thereof), shared libraries 824, or operating systems 826. In various embodiments, program instructions 820 may be encoded in platform native binary, any interpreted language such as Java™ byte-code, or in any other language such as C/C++, Java™, etc. or in any combination thereof. The program instructions 820 may include functions, operations and/or other processes usable in implementing some of the functionality of a ring controller for handling various messages in a switched fabric hierarchy (e.g., for handling various types of PCIe messages in a PCIe hierarchy), as described herein. Such support and functions may exist in one or more of the shared libraries 824, operating systems 826, or applications 822, in various embodiments. The system memory 810 may further comprise private memory locations 830 and/or shared memory locations 835 where data (including portions of a data set for an application 822 and/or various configuration parameter values) may be stored. For example, private memory locations 830 and/or shared memory locations 835 may store data accessible to concurrently executing threads, processes, or transactions, in various embodiments. In addition, the system memory 810 and/or any of the caches of processor(s) 870 may, at various times, store data that has been fetched (or prefetched) from one of system memories 810 and/or from storage devices 850 by (or on behalf of) an application executing on computing node 800. Note that the system memory 810 and/or any of the caches of processor(s) 870 may, at various times, store any other data usable in implementing the techniques described herein, some of which may include values that are configurable by the programmer or by a user.

Although various embodiments have been described above in considerable detail, numerous variations and modifications will become apparent to those skilled in the art once the above disclosure is fully appreciated. For example, although many of the embodiments are described in terms of particular types of switched fabric networks, shared I/O devices, and/or system architectures, it should be noted that the techniques and mechanisms disclosed herein for utilizing a ring controller in handling various messages within a switched fabric hierarchy may be applicable in other contexts in which there are multiple nodes, and that may benefit from the techniques described herein. It is intended that the following claims be interpreted to embrace all such variations and modifications.

What is claimed is:

1. An apparatus, comprising:
a processor;
a memory comprising program instructions that when executed on the processor causes the processor to perform at least a portion of an application;
a network interface that connects the apparatus to a switched fabric hierarchy; and
a ring controller;
wherein, during execution of the application, the ring controller is configured to:
receive one or more posted transactions, each representing a message;
determine, for one of the posted transactions, a type for the message, wherein the determined type is one of a plurality of message types supported by the switched fabric hierarchy; and
store, for the one of the posted transactions, information about the message in a data structure that is configured to store information about a plurality of messages of the determined type; and
wherein, during execution of the application and subsequent to the information about the message being stored in the data structure, the processor is configured to:
retrieve the information about the message from the data structure; and
process the message.

2. The apparatus of claim 1,
wherein the apparatus implements a root complex in the switched fabric hierarchy; and
wherein the determined message type is one of a plurality of error message types.

3. The apparatus of claim 2, wherein the posted transaction is received from one of a plurality of endpoint devices in the switched fabric hierarchy.

4. The apparatus of claim 1,
wherein the data structure is one of a plurality of data structures, each of which is configured to store information about a plurality of messages of a respective different type; and
wherein to retrieve the information about the message from the data structure, the processor is configured to select the message from among messages stored in the plurality of data structures dependent on a relative priority between the messages or their message types.

5. The apparatus of claim 4,
wherein, during execution of the application, the ring controller is configured to:
determine, for another one of the posted transactions, that the message is to be dropped, wherein to determine that the message is to be dropped, the ring controller is configured to determine that information in the packet header or contents of the posted transaction does not match pre-determined criteria for classifying the message as being of one of the message types stored in one of the plurality of data structures.

6. A method, comprising:
receiving, by a node in a switched fabric hierarchy, a posted transaction representing a message;
determining, by the node, a type for the message, wherein the determined type is one of a plurality of message types supported by the switched fabric hierarchy;
storing, by the node, information about the message in a data structure that stores information about messages of the determined type;
retrieving, by the node subsequent to storing the information about the message in the data structure, the information about the message; and
processing, by the node, the message.

7. The method of claim 6, further comprising:
returning, by the node prior to said storing, flow control credits associated with the posted transaction.

8. The method of claim 6, further comprising:
prior to said receiving, configuring the data structure and each of one or more other data structures to store messages of respective different message types.

9. The method of claim 6,
wherein the data structure comprises a ring buffer; and
wherein the method further comprises, prior to said receiving, configuring the ring buffer, wherein configuring the ring buffer comprises one or more of: allocating memory for the ring buffer, determining a size of the ring buffer, storing the determined size in a register, determining a starting address for the ring buffer, storing an indication of the starting address for the ring buffer in a register, setting a value of a head pointer for the ring buffer, initializing a value of a tail pointer for the ring buffer, or initializing a value of a counter associated with the ring buffer.

10. The method of claim 8, further comprising:
receiving another posted transaction representing another message of the determined type;
determining that the ring buffer is full; and
in response to determining that the ring buffer is full:
increasing the size of the ring buffer;
dropping the other message without processing it; or
generating an interrupt indicating that the message was dropped.

11. The method of claim 6,
wherein determining the type for the message comprises:
examining a value of a field in a packet header of the posted transaction; and
comparing the value of the field to predetermined criteria for classifying messages of the plurality of message types supported by the switched fabric hierarchy.

12. The method of claim 6,
wherein the node implements a root complex in the switched fabric hierarchy; and
wherein the determined message type is a correctable error message type or a non-correctable error message type.

13. The method of claim 6,
wherein the node implements an endpoint device in the switched fabric hierarchy; and
wherein the determined message type is a vendor-defined message type or another non-error message type.

14. The method of claim 13,
wherein the posted transaction is received from a root complex component in the switched fabric hierarchy; and
wherein determining the type for the message comprises:
examining a value of a field in the posted transaction; and
comparing the value of the field to predetermined criteria for classifying vendor-defined messages or other non-error messages.

15. A system, comprising:
a computing node configured as a root complex component in a switched fabric hierarchy;
two or more computing nodes configured as endpoints in the switched fabric hierarchy;
a network switch for the switched fabric network that connects the root complex component and the endpoints to each other; and
a memory;
wherein at least one of the two or more computing nodes configured as endpoints or the computing node configured as a root complex component comprises a ring controller; and
wherein the ring controller is configured to:
receive a posted transaction representing a message;
determine a type for the message, wherein the determined type is one of a plurality of message types supported by the switched fabric hierarchy; and
store information about the message in a data structure that stores information about messages of the determined type, wherein the data structure resides in the memory; and
wherein, subsequent to the information about the message being stored in the data structure, the at least one of the computing nodes is configured to:
retrieve the information about the message from the data structure; and
process the message.

16. The system of claim 15,
wherein the data structure is one of a plurality of data structures, each of which is configured to store messages of a respective different message type.

17. The system of claim 15,
wherein the ring controller is a component of the computing node configured as the root complex component; and wherein the data structure is one of a plurality of data structures, each of which is configured to store error messages of a respective different error message type.

18. The system of claim 15, wherein, subsequent to receiving the posted transaction and prior to storing information about the message in the data structure, the ring controller is configured to return flow control credits associated with the posted transaction.

19. The system of claim 15,
wherein the data structure comprises a ring buffer;
wherein the computing node configured as the root complex component is configured to initialize the data structure prior to its use in storing information about messages of the determined type; and
wherein to initialize the data structure, the computing node configured as the root complex component is configured to perform one of more of: allocating memory for the ring buffer, determining a size of the ring buffer, storing the determined size in a register, determining a starting address for the ring buffer, storing an indication of the starting address for the ring buffer in a register, setting a value of a head pointer for the ring buffer, initializing a value of a tail pointer for the ring buffer, or initializing a value of a counter associated with the ring buffer.

20. The system of claim 15, wherein the two or more computing nodes configured as endpoints collectively execute a distributed application.

* * * * *